US008257832B2

(12) United States Patent
Wilhelm et al.

(10) Patent No.: US 8,257,832 B2
(45) Date of Patent: Sep. 4, 2012

(54) AMINOPLAST OR PHENOPLAST RESIN BASED ON AT LEAST ONE GLYOXAL MONOACETAL AND ON GLYOXYLIC ACID, AND ITS USES

(75) Inventors: Didier Wilhelm, Issy les Moulineaux (FR); Ngoc Can Vu, Paris (FR)

(73) Assignee: Clariant Specialty Fine Chemicals (France), Nanterre (FR)

( * ) Notice: Subject to any disclaimer, the term of this patent is extended or adjusted under 35 U.S.C. 154(b) by 427 days.

(21) Appl. No.: 12/301,799

(22) PCT Filed: May 21, 2007

(86) PCT No.: PCT/EP2007/054846
§ 371 (c)(1),
(2), (4) Date: Feb. 25, 2009

(87) PCT Pub. No.: WO2007/135108
PCT Pub. Date: Nov. 29, 2007

(65) Prior Publication Data
US 2010/0247941 A1    Sep. 30, 2010

(30) Foreign Application Priority Data

May 24, 2006 (FR) .................................. 06 04681

(51) Int. Cl.
*B32B 5/66* (2006.01)
(52) U.S. Cl. ............... 428/532; 428/536; 428/537.1; 428/537.7; 538/230
(58) Field of Classification Search ............. 428/532, 428/536, 537.1, 537.7; 528/230
See application file for complete search history.

(56) References Cited

U.S. PATENT DOCUMENTS

| 4,968,774 | A |   | 11/1990 | Didier et al. |
| 5,538,793 | A | * | 7/1996  | Inokuchi et al. ............. 428/407 |
| 5,539,077 | A |   | 7/1996  | Floyd |
| 5,665,851 | A | * | 9/1997  | Wilhelm et al. ............. 528/230 |
| 5,691,426 | A |   | 11/1997 | Floyd |
| 5,830,978 | A |   | 11/1998 | Floyd |
| 7,169,881 | B2 |  | 1/2007  | Hopkins et al. |

FOREIGN PATENT DOCUMENTS

| EP | 0381905 |   | 8/1990 |
| EP | 0698627 |   | 2/1996 |
| EP | 0796288 |   | 9/1997 |
| EP | 0958805 | * | 11/1999 |
| EP | 1582203 | * | 10/2005 |
| EP | 1652868 | * | 5/2006 |

OTHER PUBLICATIONS

PCT International Search Report for PCT/EP 2007/054846 mailed Aug. 28, 2007.
PCT Written Opinion of the International Searching Authority for PCT/EP 2007/054846, mailed Aug. 28, 2007.
PCT International Preliminary Report on Patentability for PCT/EP 2007/054846, Aug. 5, 2008.

* cited by examiner

*Primary Examiner* — Leszek Kiliman
(74) *Attorney, Agent, or Firm* — Anthony A. Bisulca

(57) ABSTRACT

The invention relates to aminoplast or phenoplast resins comprising the reaction product of the following compounds:
  a substituted or unsubstituted amine derivative or a substituted or unsubstituted phenol derivative;
  at least one glyoxal monoacetal; and
  glyoxylic acid,
and also the compositions containing them and their uses as adhesives or binders.

28 Claims, No Drawings

AMINOPLAST OR PHENOPLAST RESIN BASED ON AT LEAST ONE GLYOXAL MONOACETAL AND ON GLYOXYLIC ACID, AND ITS USES

The present invention relates to formaldehyde-free aminoplast or phenoplast resins based on at least one glyoxal monoacetal and comprising glyoxylic acid, the compositions containing them and also their uses as adhesives or binders.

The change in regulations, especially as regards environmental and health protection, has led to the development of formaldehyde-free resins, with a view to limiting the release of formaldehyde into industrial effluents and the environment.

Aminoplast resins based on amine derivatives, such as urea or melamine, and on aldehydes, and their uses for treating cellulose fibres are described, for example, in Patents EP 0 381 905 and EP 0 698 627.

Patent EP 0 796 288 describes formaldehyde-free resins based on an amine derivative and on glyoxal monoacetal, of which the reaction product is mixed with a polyol, and its uses as binders for nonwoven substrates.

A formaldehyde-free resin composition comprising the reaction product of a) melamine, b) at least one aldehyde, c) a crosslinking agent made up of glyoxylic acid, and d) at least one polyol having at least 2 hydroxyl groups is described in Patent EP 1 652 868. This composition is prepared by condensing, in a first step, the melamine and the aldehyde then in condensing, in a second step, the product obtained in the previous step with the glyoxylic acid and the polyol. The application examples of this patent show that a resin composition free from glyoxylic acid, used as a binder in filter paper, has a tensile strength and an elongation at break that are lower than those of a resin composition comprising both the glyoxylic acid and the polyol.

However, these resins do not provide all the mechanical advantages of resins containing formaldehyde, especially as regards the tensile strength properties.

The technical problem to be solved consists therefore in providing resin compositions which, while respecting the current regulations, behave in many applications as formaldehyde-based resins, such as melamine-formaldehyde, urea-formaldehyde or phenol-formaldehyde resins, while not containing any formaldehyde.

It has now been discovered that the addition of glyoxylic acid in situ to an aminoplast or phenoplast resin based on at least one glyoxal monoacetal favours the realization of a higher molecular weight and produces a composition whose tensile strength properties are improved.

These properties are particularly advantageous for the use of these compositions for treating woven or nonwoven fabrics or in the manufacture of ligneous materials from agricultural waste and wood, such as fibreboards, particleboards and other similar boards and plywoods.

One subject of the invention is therefore, according to a first aspect, an aminoplast or phenoplast resin comprising the reaction product of the following compounds:
  a substituted or unsubstituted amine derivative or a substituted or unsubstituted phenol derivative;
  at least one glyoxal monoacetal; and
  glyoxylic acid.

The term "glyoxylic acid" is understood to mean in the present description both the free acid form and the hydrated form of glyoxylic acid and also the water-soluble salts of glyoxylic acid, for example the alkali or alkaline-earth metal, in particular sodium, calcium or magnesium salts, or else amine or ammonium salts.

The reaction product of the following compounds:
  a substituted or unsubstituted amine derivative or a substituted or unsubstituted phenol derivative;
  at least one glyoxal monoacetal; and
  glyoxylic acid
is a novel product that represents a subsequent aspect of the invention.

The term "glyoxal monoacetal" is understood to mean a compound of formula (I)

in which $R_1$ and $R_2$, being identical or different, represent a linear or branched $C_1$-$C_8$ alkyl group or else $R_1$ and $R_2$ are linked to form a 1,3-dioxolan-2-yl group optionally substituted at positions 4 and/or 5 by one or more $C_1$-$C_4$ alkyl substituents, or a 1,3-dioxan-2-yl group optionally substituted at positions 4 and/or 5 and/or 6 with one or more $C_1$-$C_4$ alkyl substituents.

In the rest of the description, it is understood that the glyoxal monoacetal of formula (I) above may also exist in its hydrated form with the following formula:

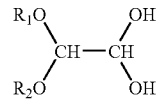

The term "linear or branched $C_1$-$C_8$ alkyl group" is understood to mean in particular a methyl, ethyl, propyl, isopropyl, butyl, isobutyl, pentyl, hexyl, heptyl and octyl group.

Preferably, $R_1$ and $R_2$ represent a linear or branched $C_1$-$C_4$ alkyl group, preferably the same group and in particular a methyl group.

When $R_1$ and $R_2$ represent methyl, the monoacetal of formula (I) is dimethoxyethanal (DME), which is a preferred glyoxal monoacetal and is sold by Clariant Specialty Fine Chemicals (France) under the trademark HIGHLINK® DM.

Urea, ethyleneurea, 1,3-dimethylurea, melamine, glycoluril, benzoguanamine or mixtures thereof are used, for example, as the substituted or unsubstituted amine derivative. Melamine, urea or mixtures thereof are preferred.

The aminoplast or phenoplast resins according to the invention may be prepared by a method comprising steps consisting in:
  reacting a substituted or unsubstituted amine derivative or a substituted or unsubstituted phenol derivative with at least one glyoxal monoacetal; then
  adding the glyoxylic acid to the (poly)condensation product thus obtained.

The (poly)condensation product of an amine derivative as defined above with a glyoxal monoacetal of formula (I) is hereinafter referred to as "aminoplast resin based on at least one glyoxal monoacetal".

The advantageous aminoplast resins based on at least one glyoxal monoacetal are, for example, those that are based on a nitrogen-containing compound/dimethoxyethanal (DME) mixture, preferably in a ratio of about 1/1 to 1/3, especially 1/1.5 to 1/2.5, particularly 1/2.

Preferably, the aminoplast resins based on at least one glyoxal monoacetal are chosen from urea-DME, melamine- DME or melamine-urea-DME type resins, sold by Clariant (France) in the HIGHLINK® range.

Phenol, resorcinol, tannins, lignins or mixtures thereof are used for example, as the substituted or unsubstituted phenol derivative. Phenol is preferred.

The (poly)condensation product of a phenol derivative, as described above, with a glyoxal monoacetal of formula (I) is hereinafter referred to as "phenoplast resin based on at least one glyoxal monoacetal".

The advantageous phenoplast resins based on at least one glyoxal monoacetal are, for example, those that are based on a phenols/dimethoxyethanal (DME) mixture preferably in a ratio of about 1/1 to 1/3, especially 1/1.5 to 1/2.5, particularly 1/2.

Preferably, the phenoplast resins based on at least one glyoxal monoacetal are chosen from phenol-DME type resins sold by Clariant Specialty Fine Chemicals (France) in the HIGHLINK® range.

Alternatively, the aminoplast or phenoplast resins according to the invention may be prepared by a method in which the substituted or unsubstituted amine derivative or the substituted or unsubstituted phenol derivative is reacted simultaneously with at least one glyoxal monoacetal and with the glyoxylic acid.

At the end of the preparation of the aminoplast or phenoplast resins of the invention according to one or other of the alternatives mentioned above, the pH may, if necessary, be adjusted to a neutral or basic pH, using a base. To that effect, a weak base such as triethylamine, or else a strong base such as sodium or potassium hydroxide, may for example be used, depending on the desired pH. From his/her general knowledge, a person skilled in the art is in a position to determine the base suitable for the desired adjustment.

The glyoxylic acid may be, for example, added in a quantity of 0.01 to 3, preferably from 0.1 to 1.5, in particular 0.3 molar equivalents relative to the amine derivative or to the phenol derivative.

According to a preferred aspect, the aminoplast or phenoplast resins according to the invention and the compositions containing them are totally free from alcohols, especially from $C_1$-$C_4$ alcohols or from polyols.

The invention also relates to, according to a subsequent aspect, a binder composition comprising an aminoplast or phenoplast resin based on at least one glyoxal monoacetal and on glyoxylic acid, as defined above.

According to a preferred aspect, the invention relates to a binder composition comprising an aminoplast or phenoplast resin based on at least one glyoxal monoacetal and on glyoxylic acid, as defined above, said composition comprising, in addition, at least one latex.

The term "latex" is understood to mean aqueous compositions consisting of an emulsion or a suspension of polymer particles in an aqueous medium.

Latices are well known to a person skilled in the art and are generally prepared by emulsion or suspension (co)polymerization of at least one ethylenically unsaturated monomer in an aqueous medium.

These monomers may be chosen from the group made up of:

ethylenically unsaturated mono- and di-carboxylic acids such as acrylic acid, methacrylic acid, maleic acid or fumaric acid;

aromatic vinyls such as styrene, α-methylstyrene or vinyltoluene;

(meth)acrylic acid esters like, for example, alkyl or hydroxyalkyl or alkoxyalkyl (meth)acrylates, such as methyl acrylate, ethyl acrylate, propyl acrylate, n-butyl acrylate, 2-ethylhexyl acrylate, methyl methacrylate, ethyl methacrylate, propyl methacrylate, n-butyl methacrylate, 2-ethylhexyl methacrylate, hydroxypropyl acrylate, ethoxyethyl acrylate, hydroxypropyl methacrylate or ethoxyethyl methacrylate;

esters of ethylenically unsaturated dicarboxylic acids such as butyl maleate;

vinyl esters of linear or branched carboxylic acids such as vinyl acetate, vinyl versatates, vinyl stearate or vinyl propionate;

monoolefins such as ethylene or propylene;

conjugated dienes such as butadiene or isoprene;

acrylamide, methacrylamide and their derivatives such as acrylamidomethylpropanesulphonic acid or N-methylol (meth)acrylamide;

acrylonitrile or methacrylonitrile; and vinyl chloride or vinylidene chloride.

The composition of the monomer mixture to be polymerized depends on the glass transition temperature ($T_g$) and therefore on the character that it is desired to impart to the polymer formed ("hard" latex or "soft" latex).

These latices may be obtained according to the (co)polymerization techniques known to a person skilled in the art, especially as an aqueous emulsion of the polymerizable monomers, in the presence of radical initiators and surfactants. The polymerization may be carried out as a continuous, batch or semi-continuous polymerization.

As examples of latices that may possibly be used in the present invention, mention may be made of:

acrylate copolymers (pure acrylic latex) such as MOWILITH® DM 777 sold by Clariant;

styrene/acrylate copolymers (styrene/acrylic latex) such as MOWILITH® LDM 6636 sold by Clariant, acetate/vinyl versatate copolymers (vinyl versatic latex) such as MOWILITH® LDM 2417 sold by Clariant;

vinyl acetate homopolymers such as MOWILITH® LD 167 sold by Celanese;

styrene/butadiene copolymers; and vinyl acetate/ethylene copolymers such as MOWILITH® LDM 1851 sold by Celanese.

The composition according to the invention may be prepared according to the known mixing techniques, for example by taking an aminoplast or phenoplast resin based on at least one glyoxal monoacetal and on glyoxylic acid, as described above, then by adding at least one latex while using gentle stirring.

The ingredients are usually added to the mixer following an addition order such as the one that is present in the lowest quantity is added to the ingredient that is present in the largest quantity.

The latex may represent, for example, from 1 to 99% by dry weight of all the composition constituents, preferably 10 to 90%, in particular 15 to 70%, especially 20 to 40% and more particularly 25 to 35%.

The addition of acid or latent acid curing catalysts to the binder composition is generally desirable, preferably just before its use. Suitable catalysts are, for example, hydrochloric acid, sulphuric acid, phosphoric acid, p-tolulenesulphonic acid, methanesulphonic acid, aluminium salts such as aluminium chloride and aluminium hydroxychloride, magnesium chloride, ammonium sulphate, zirconium sulphate, zinc chloride and mixtures thereof.

Mono-, di-, tri- and tetracarboxylic acids may also be used, such as acetic acid, glyoxylic acid, oxalic acid, citric acid and also mixtures thereof.

In a preferred embodiment, glyoxylic acid is used which facilitates the reaction(s) that cause crosslinking and film formation of the compositions of the present invention.

In this case, the glyoxylic acid is used as a post-addition, after obtaining the reaction product of the amine or phenol derivative, each of these derivatives being unsubstituted or substituted with at least one glyoxal monoacetal and with glyoxylic acid, said reaction product being incorporated into the aminoplast or phenoplast resin composition according to the invention.

The acid catalyst is generally added in a quantity of 0.1% to 15%, preferably 1% to 10% and more preferentially 3% to 7% by weight (on a dry basis) of the composition.

Also, other additives may be incorporated into the resin composition according to the invention, such as those conventionally used in the applications of formaldehyde-based aminoplast or phenoplast resins and known to a person skilled in the art.

Generally, these additives are added to the composition just before its use. Thus, the composition may comprise one or more adjuvants chosen from fillers, mould release agents, dyes or pigments, stabilizers, thickeners, emulsifiers, surfactants, cosolvents, antifreezes, anti-foaming agents, bactericides, fungicides, pesticides, plasticizers, flame retardants, coalescing agents, tackifiers, UV stabilizers, viscosity reducers, fragrances, antioxidants, acids, bases and buffering agents.

The compositions of the invention do not contain formaldehyde, are stable over time, possess a high solids content and have good mechanical properties such as dimensional stability under heat and tensile strength.

These properties justify the use of the resins or the compositions according to the invention as a binder for natural or synthetic fibres, such as, for example, glass fibres, nylon fibres, and polyester fibres, nonwoven substrates and also cellulose substrates.

These properties also justify the use of the resins or the compositions described above in the manufacture of impregnable substrates including laminated papers or boards and especially sheets of decorative paper or decorative laminates.

Indeed, conventionally the manufacture of laminates using thermosetting resins was carried out by impregnation of a paper support with various resins, for example phenolic or melamine-based resins, then drying and trimming. After drying and trimming, the coated (pre-impregnated) papers are stacked up and stored. The laminating phase makes it possible, by stacking of these sheets and hot pressing, to stop the reaction of the resins and thus to produce the final product. There are also methods combining, after impregnation, drying and laminating.

Another subject of the invention is the use of the resins or compositions described above in the manufacture of ligneous materials from agricultural waste and wood, such as fibreboards, particleboards, oriented strand boards (OSB), high-density and medium-density fibreboards (MDF), and other types of similar boards and plywoods.

Another subject of the invention is the use of the resins or the compositions described above as an adhesive intended to bond the materials, together or to a support, and in all their forms.

The material to be bonded may be chosen from the list comprising paper, board, plastics and wood.

Preferably, said material is wood. This material may be made from a plurality of flat layers of wood, such as thin sheets of wood used in veneering.

The adhesive may be applied to the substrate, such as a sheet of paper, then dried according to normal procedures.

The invention is illustrated, in a non-limiting way, by the examples below.

EXAMPLE 1

Preparation of the Melamine/Dimethoxyethanal/Glyoxylic Acid (1/2.7/0.25 Ratio) Reaction Product 170 g (1.35 mol) of melamine (DSM) were added to 629 g (3.63 mol) of a 60% aqueous solution of dimethoxyethanal (Clariant). This mixture was heated under stirring for 2 h at 50-55° C. while maintaining the pH close to 9-9.5 with adjustment, if necessary, with as much 20% sodium hydroxide as was required (about 7 g).

After reacting for 2 h, 50 g (0.34 mol) of a 50% aqueous solution of glyoxylic acid (Clariant) were added and the mixture was heated under stirring at a temperature of about 55-60° C. for 2 h then cooled, stabilized by raising the pH to between 7.5 and 8 with 20% sodium hydroxide (64 g) and diluted with water (80 g) in order to obtain 60% of active material.

The product obtained was a not very viscous yellow liquid with a Brookfield viscosity of 215 mPa·s.

EXAMPLE 2

Preparation of the Melamine/Dimethoxyethanal/Glyoxylic Acid (1/2.1/0.3 Ratio) Reaction Product 200 g of melamine (1.59 mol) were added to 580 g of a 60% aqueous solution of dimethoxyethanal (3.35 mol). This mixture was heated under stirring for 2 h at 50-55° C. while maintaining the pH close to 9-9.5 with adjustment, if necessary, with as much 20% sodium hydroxide as was required (about 7 g).

After reacting for 2 h, 69 g of a 50% aqueous solution of glyoxylic acid (0.47 mol) were added and the mixture was heated under stirring at a temperature of about 55-60° C. for 2 h then cooled, stabilized by raising the pH to between 7.5 and 8 with 20% sodium hydroxide (83 g) and diluted with water (61 g) in order to obtain 60% of active material.

The product obtained was a not very viscous yellow liquid with a Brookfield viscosity of 750 mPa·s.

EXAMPLE 3

Preparation of the Melamine/Dimethoxyethanal/Glyoxylic Acid (1/2.1/0.3 Ratio) Reaction Product 170 g of melamine (1.35 mol) were added to an aqueous solution made up of 311.6 g of 15% sodium glyoxylate monohydrate (Sigma Aldrich, 0.41 mol) and 495 g of 60% dimethoxyethanal (2.86 mol). This mixture was heated under stirring for 2 h at 50-55° C. while maintaining the pH close to 9-9.5 with adjustment, if necessary, with as much 20% sodium hydroxide as was required (about 7 g).

After reacting for 2 h, it was diluted with water (13 g) in order to obtain 52% of active material. The product obtained was a not very viscous yellow liquid.

COMPARATIVE EXAMPLE 1

Preparation of the Melamine/Dimethoxyethanal (1/2.1 Ratio) Reaction Product 200 g of melamine (1.59 mol) were added to 580 g of a 60% aqueous solution of dimethoxyethanal (3.35 mol). This mixture was heated under stirring for 2 h at 50-55° C. while maintaining the pH close to 9-9.5 with adjustment, if necessary, with as much 20% sodium hydroxide as was required (about 7 g).

After reacting for 2 h, it was diluted with water (213 g) in order to obtain 55% of active material. The product obtained was a not very viscous pale yellow liquid with a Brookfield viscosity of 64 mPa·s.

COMPARATIVE EXAMPLE 2

Preparation of the Melamine/Dimethoxyethanal (1/2.4 Ratio) Reaction Product 200 g of melamine (1.59 mol) were added to 660 g of a 60% aqueous solution of dimethoxyethanal (3.81 mol). This mixture was heated under stirring for 2 h at 50-55° C. while maintaining the pH close to 9-9.5 with adjustment, if necessary, with as much 20% sodium hydroxide as was required (about 7 g).

After reacting for 2 h, it was diluted with water (133 g) in order to obtain 60% of active material. The product obtained was a not very viscous pale yellow liquid with a Brookfield viscosity of 110 mPa·s.

Application Example

The resin from Example 2 was evaluated relative to the melamine/dimethoxyethanal resins from Comparative Examples 1 and 2 and relative to a PRINTOFIX® FIXATEUR WB etherified melamine/formaldehyde liquid resin sold by Clariant (pH about 8; Brookfield viscosity 100-200 mPa·s).

Magnesium chloride was used as the catalyst.

A 50% aqueous solution of glyoxylic acid was added as a post-addition to a bath (formula 2) as a supplementary catalyst.

The formulations are shown in Table 1.

TABLE 1

| Formula | 1 | 2 | 3 | 4 |
|---|---|---|---|---|
| Example 2 | | | 250 | |
| Comparative Example 1 | | 234.75 | | |
| Comparative Example 2 | 250 | | | |
| PRINTOFIX ® | | | | 314 |
| Glyoxylic acid as a post-addition | | 15.25 | | |
| MgCl$_2$ | 25 | 25 | 25 | 25 |
| Water | | qsp 1000 | | |
| pH | 4.7 | 4.7 | 4.7 | 4.7 |

50% acetic acid was added to baths 1, 3 and 4 to adjust the pH to that of bath 2.

Test pieces of Whatman filter paper (120×15 mm; 60 g/m$^2$) were impregnated by padding (P=2 bar; speed=2.5 m/min), dried and crosslinked at 120° C. for 2 min then at 150° C. for 2 min and left for 3 days in a room conditioned at 25° C. and 65% relative humidity.

Next, the tensile strength and elongation at break were measured with a Zwick tensile testing machine (pull rate: 100 mm/min) at room temperature.

Elongation at break=$(F_{max} \times dN \times 1000)$/(basis weight $(g/m^2) \times 9.81 \times$width (nm)).

The results are shown in Table 2.

TABLE 2

| | Tensile strength (N) | Elongation at break (km) |
|---|---|---|
| Reference | 24.6 | 2.8 |
| Bath 1 | 45.3 | 3.8 |
| Bath 2 | 39.6 | 3.4 |
| Bath 3 | 50.4 | 4.1 |
| Bath 4 | 42.1 | 3.6 |

These results show that the melamine/dimethoxyethanal/ glyoxylic acid resins of the present invention make it possible to achieve performance characteristics as a binder for filter paper that are greater than those of a melamine/dimethoxyethanal resin or even greater than those of a melamine/formaldehyde resin.

A significant improvement in the tensile strength can also be seen for the resin containing glyoxylic acid incorporated during its preparation relative to the post-addition of glyoxylic acid as a catalyst.

The resins of the invention have these performance characteristics without using formaldehyde.

The invention claimed is:

1. Aminoplast or phenoplast resin obtained by reacting the following compounds:
   a substituted or unsubstituted amine derivative or a substituted or unsubstituted phenol derivative;
   at least one glyoxal monoacetal; and
   glyoxylic acid,
the glyoxylic acid being in the free acid form, the hydrated form or in the form of a water-soluble salt, and wherein the aminoplast or phenoplast resin is free from polyols.

2. Aminoplast or phenoplast resin according to claim 1, wherein said at least one glyoxal monoacetal is a compound of formula (I)

wherein $R_1$ and $R_2$ are identical or different, and are a linear or branched $C_1$-$C_8$ alkyl group or $R_1$ and $R_2$ are linked to form a 1,3-dioxolan-2-yl group optionally substituted at positions 4 and/or 5 by one or more $C_1$-$C_4$ alkyl substituents, or a 1,3-dioxan-2-yl group optionally substituted at positions 4 and/or 5 and/or 6 with one or more $C_1$-$C_4$ alkyl substituents.

3. Aminoplast or phenoplast resin according to claim 2, wherein $R_1$ and $R_2$ are identical or different and are a linear or branched $C_1$-$C_8$ alkyl group selected from the group consisting of methyl, ethyl, propyl, isopropyl, butyl, isobutyl, pentyl, hexyl, heptyl and octyl.

4. Aminoplast or phenoplast resin according to claim 2, wherein $R_1$ and $R_2$ are identical or different and are a linear or branched $C_1$-$C_4$ alkyl group.

5. Aminoplast or phenoplast resin according to claim 2, wherein $R_1$ and $R_2$ are a methyl group.

6. Aminoplast or phenoplast resin according to claim 1, wherein the substituted or unsubstituted amine derivative is selected from the group consisting of urea, ethyleneurea, 1,3-dimethylurea, dihydroxyethyleneurea, melamine, glycoluril, benzoguanamine and mixtures thereof.

7. Aminoplast or phenoplast resin according to claim 1, wherein the substituted or unsubstituted phenol derivative is selected from the group consisting of phenol, resorcinol, tannins, lignins and mixtures thereof.

8. Aminoplast or phenoplast resin according to claim 6, wherein the glyoxal monoacetal is dimethoxyethanal (DME).

9. Aminoplast or phenoplast resin according to claim 1, wherein the aminoplast or phenoplast resin is free from alcohols.

10. Aminoplast or phenoplast resin according to claim 9, wherein the glyoxylic acid is added in a quantity of 0.01 to 3 molar equivalents of glyoxylic acid relative to the amine derivative or to the phenol derivative.

11. Binder composition comprising an a inoplast or phenoplast resin according to claim 1.

12. Composition according to claim 11, wherein the composition is free from alcohols.

13. Composition according to claim 11, further comprising at least one latex.

14. Composition according to claim 1 wherein the at least one latex is selected from the group consisting of acrylate copolymers, styrene/acrylate copolymers, acetate/vinyl versatate copolymers, vinyl acetate homopolymers, styrene/butadiene copolymers and vinyl acetate/ethylene copolymers.

15. Composition according to claim 13, wherein the at least one latex is present in a ratio of 1 to 99% by dry weight of all the composition constituents.

16. Composition according to claim 13, wherein the at least one latex is present in a ratio of 20 to 40% by dry weight of all the composition constituents.

17. Composition according to claim 11, further comprising at least one catalyst selected from the group consisting of hydrochloric acid, sulphuric acid, phosphoric acid, p-toluenesulphonic acid, methanesulphonic acid, aluminium salts, magnesium chloride, ammonium sulphate, zirconium sulphate, zinc chloride, acetic acid, glyoxylic acid, oxalic acid and citric acid.

18. Composition according to claim 11, further comprising one or more adjuvants selected from the group consisting of fillers, mould release agents, dyes, pigments, stabilizers, thickeners, emulsifiers, surfactants, cosolvents, antifreezes, anti-foaming agents, bactericides, fungicides, pesticides, plasticizers, flame retardants, coalescing agents, tackifiers, UV stabilizers, viscosity reducers, fragrances, antioxidants, acids, bases and buffering agents.

19. An article comprising an aminoplast or phenoplast resin according to claim 1, wherein the article is selected from the group consisting of fibreboards, particieboards, oriented strand boards, high-density fibreboards and medium-density fibreboards 20. An impregnable substrate manufactured using an aminoplast or phenolplast resin according to claim 1.

21. An adhesive for bonding materials together or to a support comprising an aminoplast or phenoplast resin according to claim 1.

22. The adhesive according to claim 21, wherein the material to be bonded is selected from the group consisting of paper, board, plastics and wood.

23. A binder for natural or synthetic fibres comprising an aminoplast or phenoplast resin as claimed in claim 1.

24. Reaction product of the following compounds:
   a substituted or unsubstituted amine derivative or a substituted or unsubstituted phenol derivative;
   at least one glyoxal monoacetal; and
   glyoxylic acid,
the glyoxylic acid being in the free acid form, the hydrated form or in the form of a water-soluble salt and wherein the reaction product is free of polyols.

25. Aminoplast or phenoplast resin according to claim 9, wherein the glyoxylic acid is added in a quantity of 0.1 to 1.5 molar equivalents of glyoxylic acid relative to the amine derivative or to the phenol derivative.

26. Composition according to claim 13, wherein the at least one latex is present in a ratio of 10 to 90% by dry weight of all the composition constituents.

27. Composition according to claim 13, wherein the at least one latex is present in a ratio of 25 to 35% by dry weight of all the composition constituents.

28. The impregnable substrate as claimed in claim 20, wherein the impregnable substrate is a laminated paper or board.

* * * * *